United States Patent [19]

Fall

[11] Patent Number: 4,487,413

[45] Date of Patent: Dec. 11, 1984

[54] EXERCISE DEVICE AND METHOD

[76] Inventor: James R. Fall, 2205 W. Edna Dr., Santa Ana, Calif. 92706

[21] Appl. No.: 425,561

[22] Filed: Sep. 28, 1982

[51] Int. Cl.³ .............................................. A63B 23/00
[52] U.S. Cl. ..................................... 272/125; 272/109
[58] Field of Search .................. 272/62, 63, 125, 126, 272/93, 109, 144

[56] References Cited

U.S. PATENT DOCUMENTS

| | | | |
|---|---|---|---|
| 2,944,815 | 7/1960 | Moyer | 272/109 |
| 3,119,614 | 1/1964 | Berry | 272/125 |
| 3,372,928 | 3/1968 | Showalter | 272/125 X |
| 3,397,884 | 8/1968 | Blasi | 272/125 |
| 3,405,939 | 10/1968 | Iannone | 272/109 |
| 3,534,955 | 10/1970 | Wieland | 272/63 |
| 3,966,200 | 6/1976 | Kirk | 272/126 |

*Primary Examiner*—Richard J. Johnson
*Attorney, Agent, or Firm*—Knobbe, Martens, Olson & Bear

[57] ABSTRACT

An exercise device for performing isometric exercises comprises a pair of vertical exercise bars, slidably mounted on a frame so that the spacing therebetween is adjustable. Each of these exercise bars mounts respective ring-shaped exercise handles. The exercise handles are rotatable, about a horizontal axis, and are movable, both vertically, along the bars, and rotatably, about the bars, to permit adjustment to virtually an infinite number of positions.

The exercise device permits an improved form of isometric exercise, which is dynamic, rather than static. By applying force to the exercise handles or bars, and maintaining muscle tension as the user moves in a smooth, fluid motion to change his body position, the user's muscles are isometrically exercised throughout a continuous range of positions.

27 Claims, 14 Drawing Figures

EXERCISE DEVICE AND METHOD

BACKGROUND OF THE INVENTION

The present invention relates to exercise devices, and methods of exercising, and particularly to isometric exercise methods and devices.

Exercise devices and programs in use today may be classified into two types: isotonic, and isometric.

When performing isotonic exercises, the exerciser's movements are opposed by the force of gravity, or by a spring. All weight-lifting exercises are isotonic exercises. Such exercises are commonly performed using barbells or exercise machines, which utilize either springs or weights to oppose the users's movements.

Isotonic exercise machines typically exercise only a specified muscle or group of muscles, and thus, a variety of different exercise devices may be needed to exercise the various muscle groups throughout the body. Purchasing such a variety of equipment can involve a sizable monetary investment. In addition, a substantial amount of floor space may be required to set up the various exercise machines desired.

Moreover, in isotonic type exercises, the use of fixed weights does not permit compensating for individual variations in energy output from day to day. On one day the exerciser may be at a physical peak and have no difficulty in performing the desired number of repetitions of a particular exercise with a fixed weight comfortably. However, a day or two later the exerciser may not be at that physical peak and may have to struggle to perform the same exercise.

Isometric exercises alleviate many of the problems associated with isotonic exercise, since, in this type of exercise the exerciser pushes or pulls against an immovable object, thereby permitting him to automatically adjust the load on his muscles to match his physical condition.

When performing an isometric exercise, the exerciser typically pushes or pulls against a wall, or a piece of furniture. Alternatively, he may push or pull against himself—e.g. by grasping a portion of his body with a hand. The exerciser tenses a muscle or small group of muscles, then locks it into a fixed position and maintains such tension for an extended period of time. Inherently, this is a static form of exercise, and the exerciser must assume a different position each time he wants to exercise a different muscle or part thereof. Thus, it is extremely difficult, if not impossible, to build strength evenly along the muscle being exercised. Since it is desirable to tone the entire muscle rather than only one part of it, most people prefer to use isotonic exercises, despite their disadvantages.

A problem common to both isometric and isotonic exercises is that neither emphasizes overall cardiovascular fitness. Since these exercises generally utilize only a single muscle or small group of muscles at a time, the entire body is not involved in performing an exercise. While the heart rate of the exerciser may increase during performance of isotonic or isometric exercises, the increased blood flow is required only by the muscles being exercised, therefore resulting in a less than complete exercise of the cardiovascular system.

SUMMARY OF THE INVENTION

The present invention alleviates the above problems by providing an isometric exercise device which permits use of a dynamic, rather than static, form of isometric exercise. The device allows the user to exercise his entire body in a fluid, coordinated manner which enhances bodily strength, flexibility, grace and fitness. The exercise device of the present invention is designed so that virtually any person regardless of age, size, weight, sex, or level of physical fitness can utilize the device to improve his physical condition and health.

The device comprises a pair of vertical exercise bars which may be set at variable spacings relative to each other. Each of these exercise bars mounts respective ring-shaped exercise handles. The exercise handles are rotatable, about a horizontal axis, and are movable, both vertically, along the bars, and rotably about the bars, to permit adjustment to virtually an infinite number of positions. For example, they may be located at a height ranging from a few inches above the ground to a position well over the user's head. Further, by changing the spacing of the vertical exercise bars the handles may be separated by a distance of only a few inches, or by a distance sufficient to allow the user to grasp the handles with his arms outstretched from the sides of his body. In effect, the exercise rings provide the equivalent of an exercise bar or pair of exercise bars having virtually infinitely variable orientations, which, when grasped by the user, permit the user to exercise in a wide variety of positions.

Thus by changing the orientation of the exercise handles and bars, a wide variety of exercises may be performed. Each change in the height, distance or position of the handles is easily and quickly accomplished by the use of quick-setting locks to freeze the position of the handle.

A significant advantage of the present invention is that, by applying force to the exercise rings or bars to tense muscles in the user's body, and maintaining such tension as the user moves his torso in a smooth, fluid motion to change his body position, the tensed muscles are isometrically exercised throughout a continuous range of positions, from a starting position to a finish position.

Each muscle, therefore, may be exercised from a position where it is fully contracted to a position where it is fully extended, thus evenly exercising the muscle along its entire length and providing strength throughout the muscle. Further, since there are essentially an infinite number of positions and exercises which may be performed on this device, a wide assortment of muscles may be exercised. In this way, muscles can be built up and toned substantially faster than they can by performing either isotonic or static-type isometric exercises.

Another advantage of the isometric exercise device of the present invention is that muscles throughout the entire body can be exercised simultaneously, rather than only a single muscle or small group of muscles at a time. The upper body and lower body may alternately oppose and aid each other, with the opposing or aiding being done through pressure passing through the midsection of the body. Virtually every type of isotonic exercise may be paralleled by the use of this isometric exercise device, and a substantial number of exercises which cannot be performed on isotonic exercise devices are now possible because of the enhanced number of exercise positions associated in the present invention. Further, this device is the only piece of equipment required for a complete exercise program, thus resulting in a considerable savings in both floor space and equipment investment.

Moreover, there are no weights or springs involved in an exercise program utilizing the device of the present invention, and thus, the possibility of injury is substantially reduced. The exerciser may determine exactly what he is capable of doing, and if at any time in performing an exercise he feels a strain developing, he can immediately decrease his muscle tension and/or use another part of his body to assist, thereby preventing that strain from developing into an injury. For example, if the exerciser is using his arms to pull his body upward, and during performance of this exercise feels a strain in a shoulder muscle, he can easily reduce or eliminate such strain by using his legs and the lower part of his body to help lift his body weight upward. In this way, injury to the person's muscles and ligaments may be prevented.

Since the entire body is involved in performing an exercise on this device, the user receives a good cardiovascular workout, which enhances his overall fitness to a considerably higher level than that resulting from performance of isotonic or isometric exercises. In addition, since the exerciser can use one part of his body to aid another in performing an exercise, the exerciser need no longer choose between straining and risking injury, or stopping the exercise and feeling as if he has not accomplished anything.

Another advantage of the present invention is that the user, while exercising, not only builds strength, but also can train his body to move in a graceful, coordinated manner. By maintaining muscle tension and, gradually changing positions, different muscle groups are brought into action in a smooth, fluid manner, so that his body is taught to function as a single coordinated unit. The invention thus avoids the excessive straining and jerky movements associated with prior art isotonic exercises. Using the present device allows the exerciser to actually build faster since, if the user begins to tire, repetitions may be continued by decreasing muscle tension, or by using another part of the body to aid in performing the exercise.

Persons wishing to increase the level of their physical fitness can do so by using the present invention, regardless of their current level of physical fitness. By using this device anyone can experience an increase in strength, flexibility, fitness potential, and grace in body movement. Further, it is believed that the present invention is particularly suitable for use in a weightless environment, and thus, may be advantageously used by astronauts to prevent body deterioration during prolonged missions in space.

DESCRIPTION OF THE DRAWINGS

These and other advantages of the present invention are best understood with reference to the drawings, in which.

DETAILED DESCRIPTION OF THE PREFERRED EMBODIMENT

Figure 1:
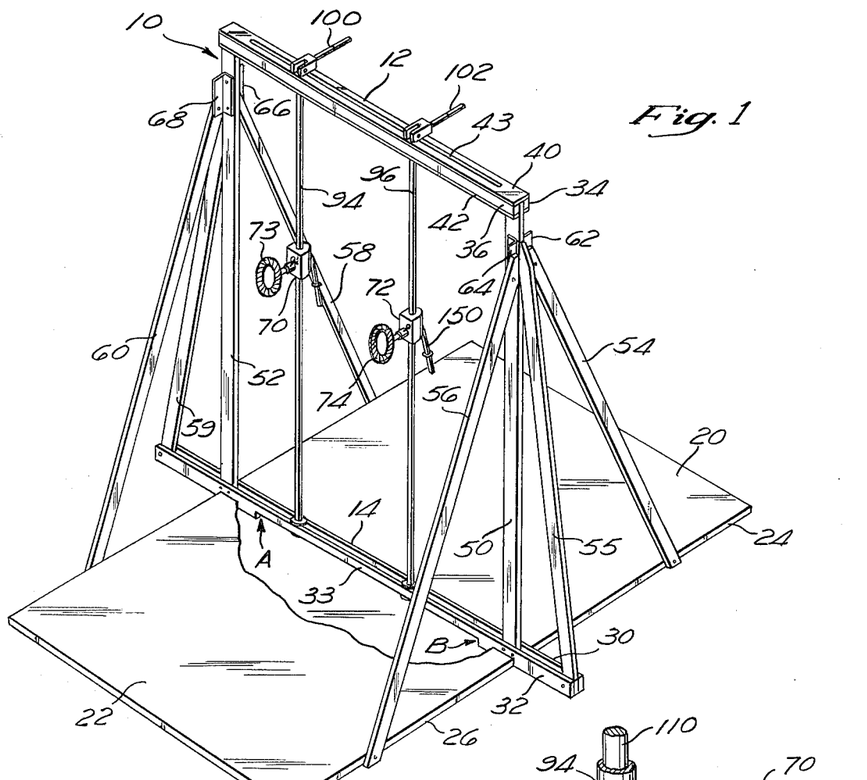
FIG. 1 is a perspective view of the exercise device of the present invention, showing parallel, vertical exercise bars retained on a platform by a frame, with a portion of the platform cut away to show a notch in the lower frame.

The present invention comprises a pair of rods, referred to herein as "exercise bars" 94, 96, retained in a vertical upstanding position by a frame 10, as shown in FIG. 1. The bars 94, 96 are movable on the frame 10, so that the spacing therebetween is adjustable. A pair of ring-shaped exercise handles, 73, 74 are mounted on the bars 94, 96 respectively by means of handle mounting assemblies 70, 72, respectively. The bars 94, 96 and handles 73, 74 therefore, may be adjusted to a virtually infinite number of positions, so that a wide variety of exercises can be performed.

The ring-shaped exercise handles 73, 74 are mounted to be rotatably adjustable about an axis perpendicular to the bars, while the assemblies 70, 72 are mounted to slide on, and rotate about the bars 94, 96.

The frame 10, which supports the bars 94, 96, comprises a horizontal upper frame 12 and a horizontal lower frame 14, joined together by a pair of vertical side frames 50, 52.

Figures 2, 3, 10A, 10B:
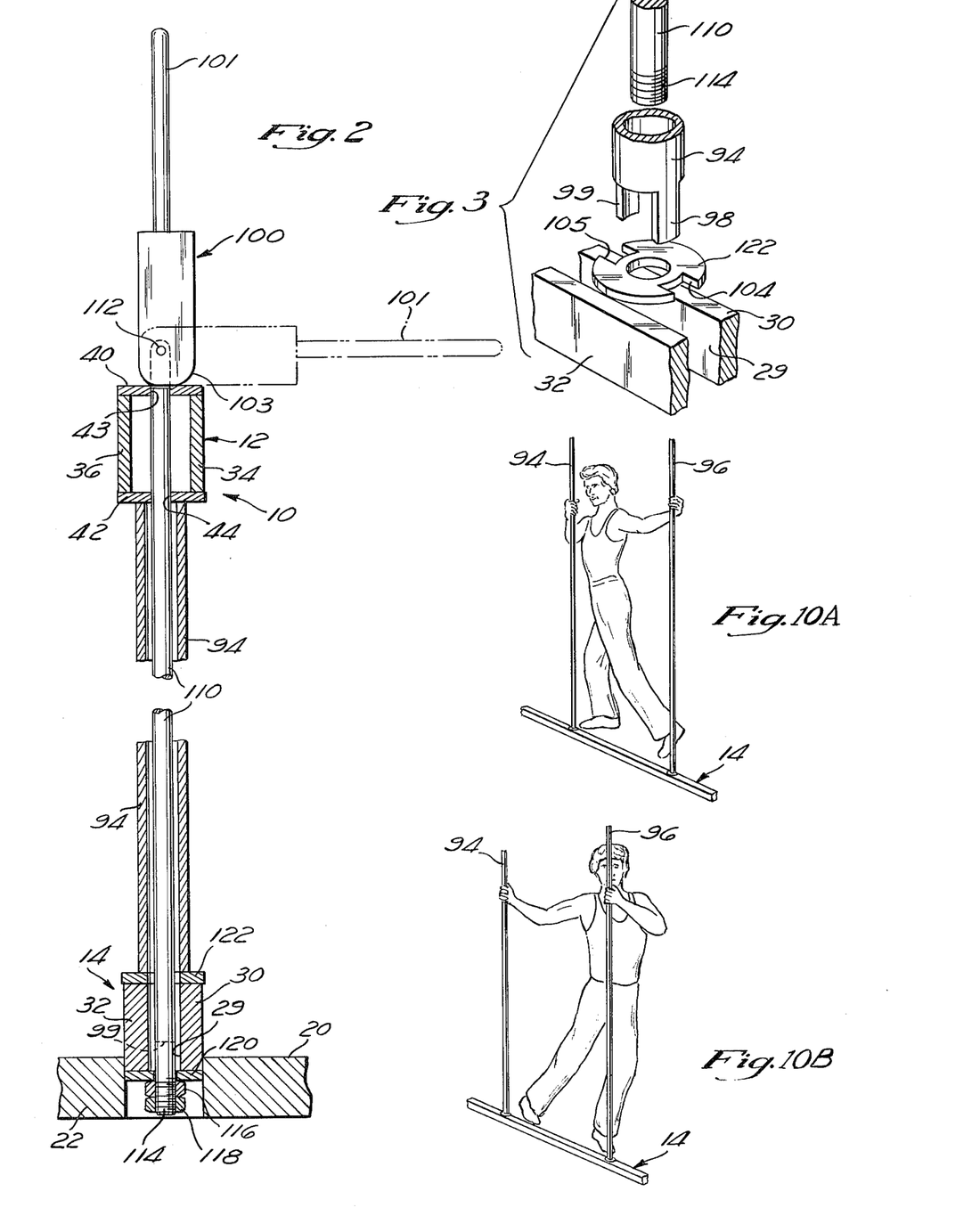
FIG. 2 is an elevation view in partial cross section of one of the exercise bars of FIG. 1, showing an over-center mechanism for locking the bar into position.
FIG. 3 is an exploded perspective view showing a pair of prongs, on the lower end of the exercise bar of FIG. 2, which are received by the lower frame channel to prevent rotation of the bars; and further showing a washer for supporting the bars on the lower frame.
FIG. 10A shows the user performing a lateral movement exercise, the user having his left arm fully extended and his right arm drawn into his body.
FIG. 10B shows the user performing the exercise begun in FIG. 10A with his right arm fully extended and his left arm close to his body.

As shown in FIGS. 1 and 2, the upper frame 12 is an elongate box-like structure, horizontally disposed, and comprised of four members: a pair of elongate plates or beams 34, 36, which form the sides of the upper frame 12, and second pair of elongate plates or beams 40, 42 which form the top and bottom respective of the upper frame 12. The top beam 40 and the bottom beam 42 have respective longitudinal slots 43, 44 therein, for receiving the upper ends of the exercise bars 94, 96. These slots 43, 44 are sufficiently long to permit movement of the exercise bars 94, 96 from the side frame 50 to the side frame 52, and thus, run substantially the length of the upper frame 12. Although only the slot 43 is shown in FIG. 1, both slots 43, 44 are visible in FIG. 2. In addition, the bottom beam 42 of the upper frame 12 includes a pair of notches at its ends, respectively, to receive the two side frames 50, 52.

The lower frame 14 rests on the floor, and is comprised of two elongate plates or beams 30, 32, disposed in spaced, parallel relationship to form a channel 29 (FIG. 2 therebetween for receiving the lower ends of the vertical exercise bars 94, 96. As shown in FIG. 1, the beam 32 includes a notch 33 between the points A and B. The beam 30 has a similar notch (not shown). These notches provide access to hardware at the lower ends of the exercise bars 94, 96.

The device also includes a platform having sections 20, 22 upon which the user stands while performing his exercises. The platform sections 20, 22 rest on the floor, and are oriented to project from opposite sides of the lower frame 14. They may be made of wood, and covered with an exercise mat. Respective perimetrical frames 24, 26 are attached to the sections 20, 22 at their perepheral edges. These frames 24, 26 are fastened to the lower frame 14, e.g. by bolting or welding, to attach the platform sections 20, 22 to the frame 14. For added support and strength, each of the side frames 50, 52 includes three angular support beams 54, 55, 56 and 58, 59, 60, respectively. The angular supports 55, 59, connect the outer ends of the lower frame 14 to the upper ends of the side frames 50, 52, respectively. The angular supports 54, 58 connect the platform frame 24 to the side frames 50, 52, respectively. The angular supports 56, 60 connect the platform frame 26 to the side frames 50, 52, respectively. Angle brackets 62, 64 and 66, 68 are included on the side frames 50, 52, respectively, for connecting the supports 54, 56 and 60, 58, respectively to the side frames 50, 52, respectively. The portions of the frame may be fastened together by any suitable means, such as by bolts or welding.

The details of the exercise bars 94, 96 are best shown in FIG. 2. The exercise bars 94, 96 comprise hollow rods or tubes, and are made, e.g., of a chrome-molybdenum alloy. Each of these bars 94, 96 is identical in construction, and thus, only the details of the bar 94 will be described. As shown in FIG. 2, a steel rod 110 telescopes within the exercise bar 94. The steel rod 110 is threaded on its lower end 114. This end 114 is inserted through a washer 122, disposed on the top side of the lower frame 14. A second washer 120, disposed on the bottom side of the lower frame, receives the threaded end 114, so that the frame 14 is sandwiched between the washers 120, 122, with the rod 110 in the channel 29. A pair of lock nuts 116, 118 are then screwed onto the threaded portion 114 to support the washers 120, 122.

The upper end of the steel rod 110 extends through the slots 43, 44 in the upper frame 12. A cam lock 100, having a slot (not shown) for receiving the end of rod 110, is rotatably mounted on the rod 110 by means of a pin 112. The cam lock 100 has a camming surface 103, which, upon rotation of the cam lock 100, cams against the top plate 40 of the upper frame 12 to selectively move the rod 110 upward or downward relative to the frame 10. A rod-shaped handle 101 is provided on the cam lock 100 to assist in rotation thereof. When the cam lock 100 is rotated to the position shown in solid lines in FIG. 2, the cam surface 103 allows the steel rod 110 to drop slightly, thus providing play between the rod 110 and frame 10, to permit the exercise bar 94 to be moved across the length of the upper frame 12 and the lower frame 14. However, when the cam lock 100 is moved to the position shown in phantom lines in FIG. 2, the cam surface 103 will lift the steel rod 110, and draw the lock nut 116 against the washer 120 so that it bears tightly against the bottom of the beams 30, 32 of the lower frame 14, thereby causing the entire assembly to be locked into position. Thus, the cam lock 100 permits the exercise bar 94 to be adjusted to any position along the frame 10, and locked in position. A cam lock 102 (FIG. 1), identical to the cam lock 100, is included on the bar 96, to permit adjustment and locking of this bar in the same manner as just described for the bar 94. Thus, by using the cam locks 100, 102 the spacing between the bars can be adjusted for various types of exercises.

To insure that the exercise bars 94, 96 do not rotate about their respective steel rods 110, prongs 98, 99 project from the upper and lower ends of each of the bars 94, 96. The prongs 98, 99 on the upper end of the bar 94 are received by the slot 44 in the upper frame 12, while the prongs 98, 99 on the lower end of the bar 94, are received as shown in FIG. 3, by a pair of cut-outs 104, 105 in the washer 122, through which the prongs pass, as they are inserted into the channel 29 of the lower frame 14. Although only the bar 94 is shown in detail in the drawings, it will be understood that the bar 96 is identical. The width of the prongs 98, 99 on the upper end of the bars is slightly less than the width of the slot 44, while width of the prongs 98, 99 on the lower end of the bars is slightly less than the width of the channel 29. This permits the bars to be moved along the frames 12, 14, but prevents them from rotating relative thereto.

Figures 4, 9:
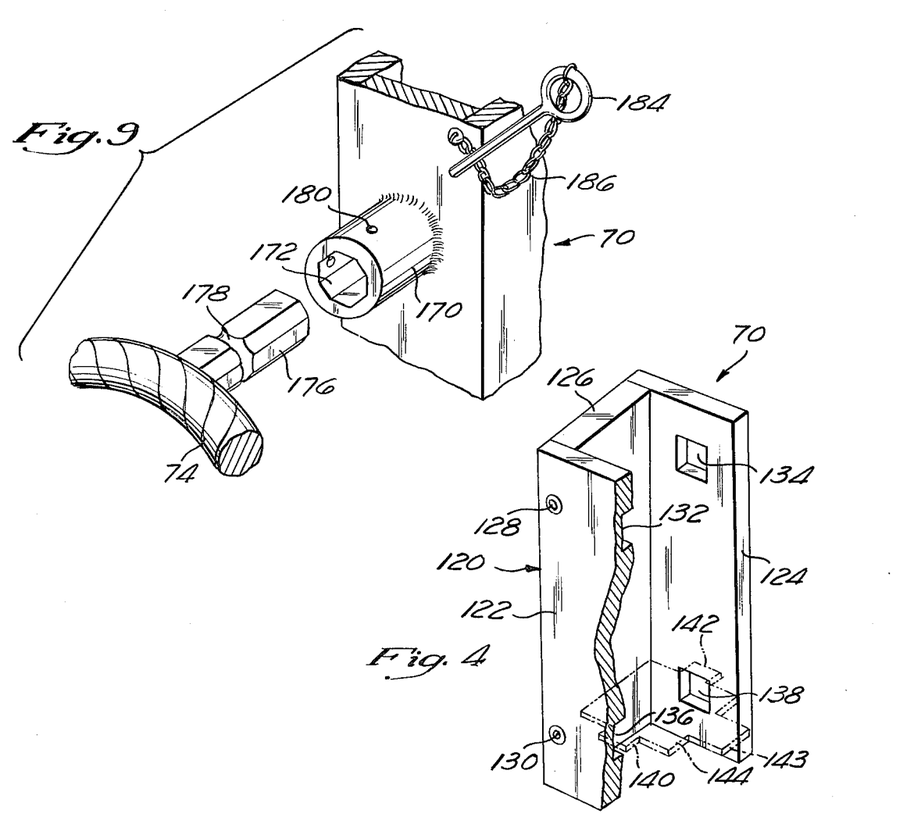
FIG. 4 is a perspective view of one of the handle mounting assembly housings, with a portion of the housing cut away to show recess for mounting the leafed plates.
FIG. 9 is a perspective view of the handle mounting assembly of FIG. 8, showing the socket for receiving the lug on the ring-shaped handle and for mounting the ring-shaped handle on the assembly.

The details of the handle-mounting assemblies 70, 72 are shown in FIGS. 4 through 9. Although only the assembly 70 is shown in the drawings, it will be understood that the assembly 72 is identical. Referring initially to FIG. 4, the assembly 70 comprises an elongate box-like housing 120. This housing 120 is formed from a pair of elongated plates 122, 124, in parallel relationship, with a third elongate plate 126 therebetween, oriented mutually perpendicularly to each of the plates 122, 124. Thus, the plates 122, 124, and 126 form a three-sided box, open on one side, as well as the top and bottom. The plates may be fastened together by any suitable means, such as by bolts 128, 130. As shown in FIG. 4, the plates 122, 124 each include upper recesses 132, 134, respectively, and lower recesses 136, 138, respectively. The upper recesses 132, 134 are in opposed facing relationship, while the lower recesses 136, 138 are also in opposed facing relationship. Each of the recesses is square, having a width sized to receive tongue portions 140, 142, on opposite sides of a generally square plate 144, shown in phantom lines in FIG. 4. This plate 144 is sized to fit within the three-sided box formed by the plates 122,124,126, and is oriented generally perpendicular to the plates 122, 124 and 126. The plate also includes a third tongue portion 143, projecting from the open side of the three-sided box, in a direction away from the plate 126. The purpose of this tongue portion 143 is discussed below.

Figure 5:
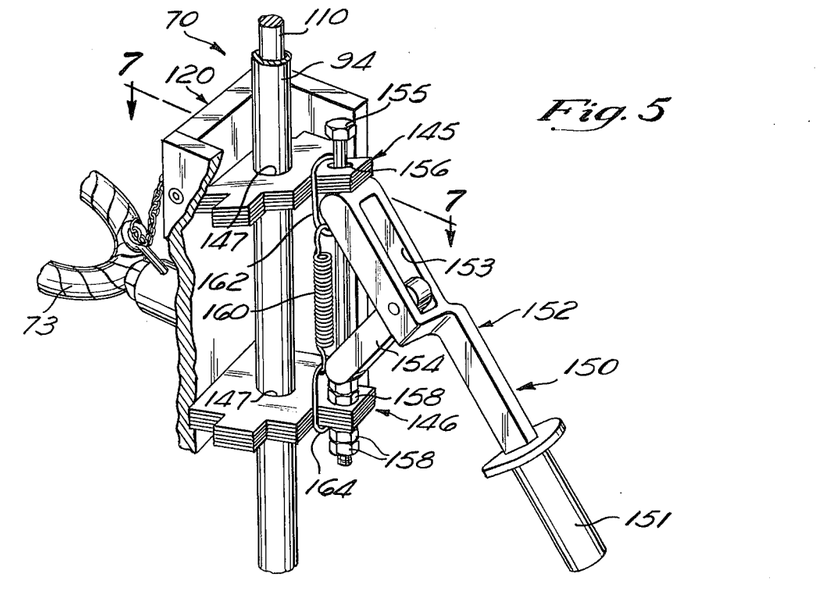
FIG. 5 is a perspective view showing one of the handle mounting assemblies mounted on an exercise bar, with a portion of the housing cut away to show the upper and lower leafed plates sets, and further showing an over-center mechanism for selectively biasing the leafed plate sets to an inclined position to lock the assembly relative to the bar, with the over-center mechanism being in the unlocked position.
Figure 6:
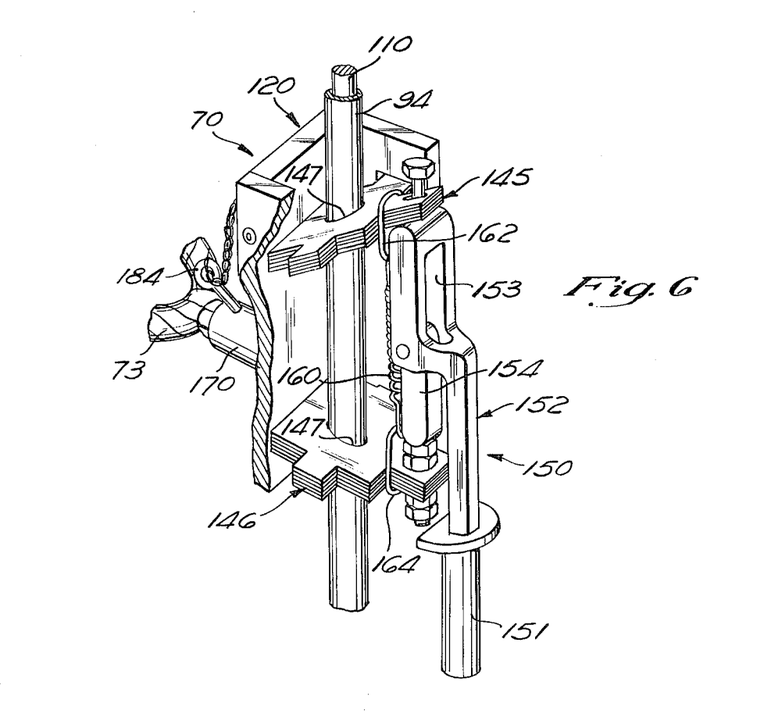
FIG. 6 is a perspective view of the handle mounting assembly of FIG. 5, showing the over-center mechanism in the locking position.

Although only a single plate 144 is shown in FIG. 4 (with the tongues 140, 142, inserted into the lower recesses 136, 138, respectively, of the plates 122, 124, respectively), it will be understood that both the lower recesses 136, 138 and the upper recesses 132, 134 receive respective sets of five such plates 144, as shown in FIGS. 5 and 6. In each set of plates, the plates 144 are stacked, one on top of the other. The upper set of plates 144 will be referred to collectively as the upper "leafed plates" 145, while the lower set of plates 144 will be referred to collectively as the lower "leafed plates" 146. The recesses 132,134 and 136,138, which mount the sets of leafed plates 145,146, respectively, have vertical dimensions slightly greater than the combined thickness of each leafed plate set 145,146, so that the sets 145,146 may be inclined at an angle (e.g., 30°) from the horizontal.

Each of the plates 144 are identical, and thus, the leaf plate sets 145,146 are identical. Further, each plate 144 has a central aperture 147, sized to receive the bar 94 to mount the housing 120 of the assembly 70 thereon, with the bar 94 parallel to the plates 122, 124, 126, and generally perpendicular to the plates 144. The diameter of the circular aperture 147 is slightly larger than the diameter of the bar 94, to permit the plates 144 to slide relative to the bar 94, when the plates 144 are generally perpendicular thereto. However, the apertures 147 are sufficiently large to permit the plates 144 to be inclined at an angle, (e.g., 30 degrees) relative to the bar 94. When so inclined, the plates 144 slide relative to each other, so that the edges of each plate aperture presses against the surface of the exercise bar 94 to grip the bar 94, and thus prevent relative movement between the assembly 70 and bar 94. The assembly 70, therefore, may be locked in any position on the bar 94 by inclining the upper and lower sets of leafed plates 145,146.

Selective inclination of the leafed plates 145,146 is accomplished by means of an over-center mechanism 150, shown in FIGS. 5 and 6. This mechanism 150 comprises a lever arm 152, one end of which is pivotally mounted to bear against the lower set of leafed plates 146, while the other end has a handle grip 151 for use in pivoting the arm 152. The over-center mechanism 150 also includes a pivotable link 154, one end of which is pivotally mounted in a slot 153 formed in the arm 152, while the other end is pivotally mounted to bear against the upper surface of the lower set of leafed plates 146. Thus, the over-center mechanism 150 is mounted between the upper and lower leafed plate sets 145,146, in a manner resembling a clevis.

Mounting of the arm 152 and link 154 against the upper and lower plate sets 145,146, respectively, is accomplished by means of a bolt 155, passing vertically through apertures 156 (FIG. 7) in the tongue portions 143 (FIG. 7) of the upper and lower leafed plate sets 145,146. The aperture 156 (FIG. 7) is oval in shape so that the bolt 155 does not bind on the edges of the aperture 156 when the plate sets 145,146 are inclined. The bolt 155 also passes through apertures (not shown) in the ends of the arm 152 and link 154. The arm 152 and pivotable link 154 are not secured relative to the bolt 155, so that they may slide thereon. Further, the upper leafed plate set 145 is also not secured to the bolt 155, so that it too is slidable thereon. The bolt 155 is sufficiently long to prevent the upper plate set 145 from traveling off the end of the bolt 155 when the plate sets 145,146 are inclined.

By moving the arm 152 from the position shown in FIG. 5, where the arm 152 and pivotable link 154 are disposed at an angle relative to one another, to the position shown in FIG. 6, where the arm and pivotable link are parallel to the bolt 155, the upper and lower leafed plate sets 145,146 are biased apart, along the bolt 155, so that the plate sets 145,146 are inclined from the perpendicular relative to the bar 94, causing the plates 144 to grip the bar 94 and lock the assembly 120 into position. The assembly 120 may be released by returning the arm 152 to the position shown in FIG. 5 so that the plates 144 may return to a position generally perpendicular to the bars 94. Such return of the plates 144 is assisted by a spring 160 attached to the tongue portions 143 of the upper and lower plate sets 145,146, by upper and lower clips 162,164, respectively. The clip 162 has a hook (not shown) which engages the lever arm 152 to keep it in bearing relationship with the upper leafed plate set 145. Thus, the clip 162 supports the arm 152 to prevent it from falling down, along the bolt 155, and against the lower leaf plate set 146.

Therefore, by pivoting the arm 152 of the over-center mechanism 150 to cause the plates 144 to selectively grip the bars 94, the user may selectively lock the assembly 70 into position.

Figures 7, 8:
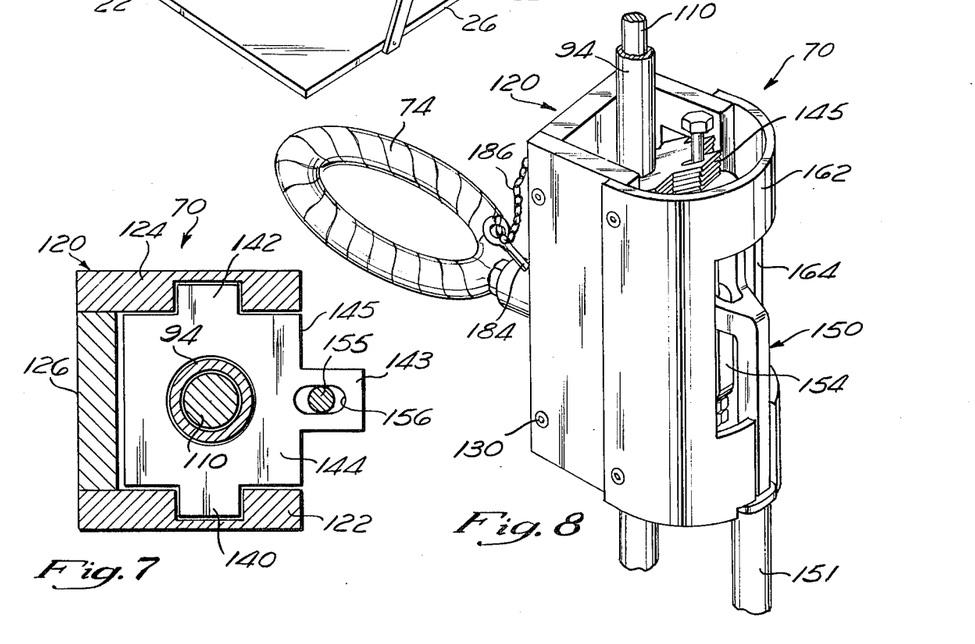
FIG. 7 is a partial cross sectional view, taken along the lines 7—7 of FIG. 6, of handle mounting assemblies.
FIG. 8 is a perspective view of one of the handle mounting assemblies shown in FIGS. 1, 5, 6, and 7.

As shown in FIG. 8, a cover 162 is provided to close the open side of the housing 120, between the plates 122,124. The cover 162 has a slot 164, through which the over-center mechanism 150 projects, so that the mechanism may be operated without removing the cover 162.

The ring shaped handle 74 is mounted on the plate 126 of the housing 120 by means of a socket 170 comprising a cyclindrical tubular member projecting perpendicularly therefrom, as shown in FIG. 9. The socket 170 has an octagonal opening 172 for receiving a corresponding octagonal lug 174. This lug 174 projects outwardly from the ring 74, but in the plane thereof. The eight flats on the octagonal lug 176, as well as the eight flats on the octagonal opening 172 are the same size, so that the lug 176 may be inserted into the opening 172 in any of eight different positions. These eight positions correspond to four different orientations of the ring shaped handle, namely, vertical, horizontal, and inclined at 45 degrees in either direction from the vertical. The lug 176 may be secured to the socket 170 by means of an annular groove 178, formed upon the surface of the lug 176. A pair of holes 180 are provided in the socket 170 for receiving a pin 184, attached to the housing 120 by a chain 186. The holes 180 are spaced so that, when the pin 184 is inserted therethrough, it rests within the groove 178 to prevent the lug 176 from sliding out of the socket 170. Thus, the pin 184 selectively locks the lug 176 of the ring shaped handle relative to the socket 170 of the housing 120.

From the foregoing, it will be understood that the ring shaped handles may be adjusted to virtually any position on the bars 94, 96. Further, either handle may be rotatably adjusted so that it lies in a horizontal plane, vertical plane, or 45 degrees inclined plane. Although the lug and socket arrangement shown in FIG. 9 is preferred, at the present time, due to manufacturing convenience, it will be understood by those skilled in the art that other arrangements, (e.g., a locking ball joint), may be alternatively utilized.

The exercise device of the present invention, therefore, provides a pair of handles 73, 74, which slide up and down the exercise bars, and rotate about the exercise bars. The horizontal spacing between the handles can be varied by changing the separation between the exercise bars 94, 96, and the vertical height and orientation of the handles 73, 74 may be varied by adjusting the position of the handles 74, 74 relative to the bars 94, 96 by means of the mounting assemblies 70, 72. These handles 73, 74 can therefore be placed in virtually any desired position, thereby permitting a wide variety of exercises to be performed. Several exemplary types of novel exercises suitable for performance on this device are described below.

One type of exercise, which involves lateral movements, is shown in FIGS. 10A and 10B. The user stands close to the lower frame 14, spaced a few inches therefrom, facing the vertical exercise bars 94, 96 with his body midway therebetween. His feet are separated at a comfortable distance—e.g. 2 feet. The exercise bars 94, 96 are horizontally separated by a distance equivalent to aproximately one-half of the user's total arm span. The user grasps the exercise bar 94 with his right hand, and the exercise bar 96 with his left hand, with each hand at about chin-height, and with the palms facing each other. The user then applies force to the bars 94, 96, e.g. in a direction which tends to push the bars towards each other, and this force is maintained, at least partially, throughout the exercise. To begin the exercise, the user may position himself, as shown in FIG. 10A, so that his right arm is bent at the elbow with his face adjacent, and in close proximity, to the exercise bar 94. He then changes position, maintaining the force against the bars, and the concommitant tension in his muscles, to the position shown in FIG. 10B, by pivoting on the balls of his feet. This position change is accomplished in a smooth, fluid motion, so that the user's body gracefully moves to a position where his face is adjacent, and in close proximity to the bar 96, with his left arm bent at the elbow and his right arm outstretched. Thus, the user moves between a first position and second position, while maintaining the force of the bars in the same direction (e.g., in this example, continually pushing the bars towards each other), thereby exercising in an isometric manner through a continuous range of positions. This permits the user's muscles to be exercised along their entire length, and allows the user to automatically adjust the tension on his muscles to match his physical condition, and/or degree of fatigue. Further, it is significant that, while this exercise is directed primarily towards muscles in a particular part of the body (the upper portion in this example), virtually the entire body is used in performing the exercise. For example, the legs are exercised by moving the body from side to side, between the first and second positions, and the midsection is exercised by twisting during such movement.

Preferably, the above-described exercise is repeated for various directions of force against the bars 94, 96. For example, the user may perform the same exercise by pushing the bars in an outward direction, perpendicular to the frame 14. After performing the desired number of repititions while pushing outward, the user may then perform an additional number of repititions while pushing downward on the bars, maintaining the force and concommitant tension in his muscles as he performs the exercise. Additionally, the user may push upward on the bars, which drives his body downward, thereby permitting him to resist with his leg muscles. This directs the force applied to the bars to the lower part of the body, thereby setting the upper body muscles against the lower body muscles, with the stress passing through the midportion of the body. From the foregoing, it will be understood that "direction of force", as used in the context of these exercises, refers to a set of two directions, i.e., one direction for each hand, which may or may not be directed along same line. Thus, for example, pushing down, pulling up, pushing outward, or pushing inward, each comprise a particular "direction of force".

The foregoing exercises may be repeated with the users hands at various heights on the bars. Further, it will be understood that these exercises may be performed using the rings instead of the bars. In such case, the rings are oriented in vertical planes projecting perpendicular to the frame, since, in this orientation, the rings provide the equivalent of vertical bars. Accordingly, as used herein to describe these exercises, the term "vertical bars" includes not only the bars 94, 96, but also the rings when they are overted in vertical planes. In practices, however, it may be easier to perform the exercise using the bars 94, 96, rather than the vertically oriented rings, since the height of the users hands can be changed simply by grasping the bars at the desired location. On the other hand, if the rings are utilized, the position of the rings must be adjusted for each position of the users hands.

Regardless of whether the rings are used to provide the "vertical bars", these rings are required for a variation of the exercise which will now be described. In this variation, the exercise is performed in the same way, except that the rings are oriented in a horizontal plane, so that the user can grasp the rings, with his hands rotated 90°—e.g. with his palms facing downward instead of towards each other. Thus, the rings, in this position provide "horizontal bars". By repeating the exercises with the user's hands in this horizontal position, additional parts of his muscles are exercised.

Further variations on the above exercises are practically endless. For example, the user may repeat these same exercises by standing in different positions, each slightly further away from the bars (and frame 14) than the other. Moreover, the user may repeat the exercise with the bars horizontally spaced at different positions. Because of the virtually infinite number of positions through which the user can move his body, virtually, all parts of a muscle may be fully exercised, from contraction, at one extreme, to extension, at the other extreme. Although the above exercises are directed primarily towards the muscles in the arms, shoulders, and upper torso, virtually the entire body is exercised, regardless of the direction of force applied to the bars 94, 96. Thus, the user receives a good cardiovascular workout, in addition to toning, building, and strengthening his muscles.

In another type of exercise, shown in FIGS. 11A, B, and C, the user adjusts the ring-shaped handles 73,74 so that they are slightly below waist level and facing inward, with the rings lying in a horizontal plane and directed towards each other. More specifically, the rings 73, 74 may be at a height which permits the user to grasp them, with his arms extended at his sides, when he stands directly between the bars 94, 96. The bars 94, 96 are spaced so that the user can freely walk therebetween with his arms at his sides, grasping the rings. Although only the exercise bar 94 is shown in the drawings, it will be understood that the exercise bar 96 is therebehind, hidden from view.

Figure 11A:
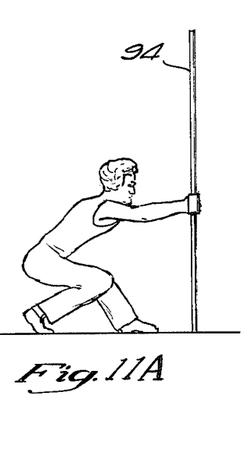
FIG. 11A shows the starting position for a type of exercise in which the user pulls himself forward, toward the exercise bars.
Figure 11B:
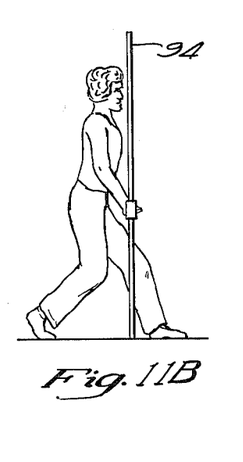
FIG. 11B shows an intermediate stage of the exercise begun in FIG. 11A, in which the user has moved closer to the exercise bars.
Figure 11C:
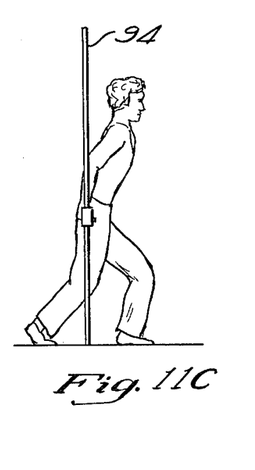
FIG. 11C illustrates a further advanced position of the exercise shown in FIGS. 11A and 11B, showing the user passing between the bars.

The user begins the exercise by assuming a crouching position with his arms and shoulders forward, as shown in FIG. 11A, and applies force to the rings in a first direction. For the purposes of this discussion, it will be assumed that this first direction is e.g. inwardly on the rings 73,74, so as to pull the rings towards each other. While maintaining this force, and the concommitant tension on the user's muscles, the user gradually moves forward, towards the bars 94,96, and simultaneously lifts his body upward as he approaches the bars, as shown in FIG. 11B. The user then moves between and through the bars, as shown in FIG. 11C, maintaining the force on the rings in the same direction, with arms extended (i.e. elbow straight or only slightly bent) all the while. Preferably, the user moves as far forward as the flexibility of his body will permit. Ultimately, the user should be able to move sufficiently forward as to assume a crouching position, similar to that shown in FIG. 11A, but on the other side of the bars, with his arms outstretched behind him, still grasping the rings and maintaining the force thereon. The user then moves back through the bars 94,96 to the original position, always maintaining the force against the rings 73,74 in the same direction. Additional repetitions may be performed.

As in the previously described exercise, the user can exercise different parts of his muscles by repeating this exercise, with the force, applied to the rings, directed in another direction. For example, the user may push down on the rings for a set of repetitions, pull up on the rings for another set of repetitions, or push outward on the rings (i.e. in a direction tending to separate the bars) for still another set of repetitions. Whatever the direction of the applied force, this direction is maintained for each set of repetitions so that the muscles are exercised throughout a continuous range of positions, from the starting position to the finish position. Variations on this exercise, to work different parts of the user's muscles, may be performed by adjusting the position of the handles 73,74, or the position of the bars 94,96, or both. Like the above-described exercise, this exercise also involves the entire body, so that it too enhances cardiovascular fitness.

In another type of exercise (not shown), the rings 73,74 are positioned at about chin level, spaced apart a distance slightly greater than the shoulder span of the user. The user stands between the bars 94, 96 with his heels on the lower frame 14. The rings are oriented to lie in a horizontal plane, and are oriented so that when the user grasps the rings with his hands, they are slightly in front of his body. By pushing upward on the ring with his hands, and resisting with his legs, the user gradually lowers himself until his arms are completely extended. He then raises himself upward, pushing with his legs, but resisting such upward movement by continuing to push upward on the rings. When he reaches an upright position, he does not stop but raises on his toes to fully extend his body and tense additional muscles. He may then perform additional repetitions by repeating such downward and upward movement, continuously maintaining upward force on the rings with his hands. Typically, multiple sets of repetitions will be performed, e.g. one with the palms of the hands facing each other, and another with the palms parallel, facing outward, away from the user's body. As discussed above, changing the orientation of the user's hands is advantageous, since it causes different parts of his muscles to be exercised. Further, because this exercise sets lower body muscles against upper body muscles, the user's muscles can be highly stressed, if desired, in order to build bulk.

In a variation of this exercise, the user pulls down on the rings and works against his body weight, using his legs to assist during upward movement. This variation may be performed with the hands in three different positions, i.e. palms facing toward each other; palms parallel, facing to the front; and palms parallel, facing to the back.

As with the above-described types of exercises, the user, in this type of exercise, maintains muscle tension throughout the full range of positions, e.g. between the upright position and the squatting position, thereby exercising muscles along their complete length. Further, the entire body is again used so that cardiovascular fitness is enhanced. Variations of this type of exercise may be performed by adjusting the height of the handles 73,74 and/or the spacing therebetween. For example, the user may place the ring-shaped handles 73,74 at approximately knee level and pull up on the rings, while resisting downward movement with the legs. The user gradually moves downward until he is in a squatting position, at which time he pushes upward with his legs, resisting with his arms. In yet another variation, the handles are adjusted so that the user, standing upright, can grasp them with his arms extended at his sides. The user then moves downward, resisting at least a portion of his weight with his arms, into a "dip" position. He then assists with his legs, to move himself back towards an upright position.

The above-described exercises are illustrative of the types of exercises that can be performed on the exercise device disclosed herein. Those skilled in the art will understand that other types of exercises, utilizing one or more of the techniques or principles outlined in the above examples, may also be performed.

Although the exercise device and method of the present invention is suitable for home use, as well as gym use, the invention is believed to be particularly advantageous for use in a weightless environment, as in space. Astronauts are currently encountering problems with body deterioration, such as joint separation, due to prolonged exposure to weightlessness. It is believed that exercise device of the present invention, adapted for use in a spacecraft or space station, will provide a solution to these problems. For certain exercises, suitable straps or other supports to anchor the astronauts' feet may be necessary; however, otherwise the exercises may be performed as described. Accordingly, it is anticipated that the present invention is a tremendous breakthrough, not only in terms of enhancing the fitness of the general public, but also in terms of maintaining the health of astronauts and prolonging the potential length of missions in space.

I claim:
1. An improved method of performing isometric exercises, said method comprising:
   (a) adjusting the height of each of a pair of movable, vertically adjustable, exercise handles to one of plural positions within the reach of a user, said handles sized for grasping by the hands of the user;
   (b) rigidly locking each of said handles in said one of plural positions, so that they are temporarily immovable and stationary;
   (c) grasping one of said handles with one of the user's hands and the other of said handles with the other of user's hands;
   (d) applying force against said rigidly locked handles in one of plural directions, the direction of force applied by each hand selected to tense selected muscles in the user's body to isometrically exercise said muscles in a first position;
   (e) moving the user's torso in a smooth, fluid motion to change the position of the user's torso relative to said handles throughout a continuous range of positions, from said first position to a second position, while said handles remain immovable in said rigidly locked, stationary position, the user's weight at least partially on his feet during said movement;

(f) maintaining the direction of force applied to said handles while the torso moves through said change in position to maintain tension on said selected muscles and continuously exercise said muscles throughout said continuous range of positions.

2. An improved method of performing isometric exercises, as defined in claim 1, additionally comprising the step of:

moving the user's torso from said second position to said first position while maintaining at least a portion of said tension on said muscles.

3. An improved method of performing isometric exercises, as defined in claim 1, wherein the force applied to said one of said handles is in the opposite direction of the force applied to the other of said handles, as the user moves between said first position and said second position.

4. An improved method of performing isometric exercises, as defined in claim 1, wherein the user's hands are relatively positioned on said handles, respectively, in a first position, said method additionally comprising the step of:

rotating each of the user's hands by at least about 90° relative to such first position to a second position; and repeating steps (c) through (f) with the user's hands in said second position.

5. An improved method of performing isometric exercises, as defined by claim 1, additionally comprising the step of:

moving the user's torso from said second position to said first position while maintaining the direction of said force both during said movement from said first position to said second position, and said movement from said second position to said first position.

6. An improved method of performing isometric exercises, as defined by claim 1, additionally comprising the step of:

repeating steps (c) through (f), while maintaining said force against the handles in another of said plural directions.

7. An improved method of performing isometric exercises, as defined in claim 6, additionally comprising the step of:

repeating steps (a) through (f) for another of said plural positions of said handles.

8. An improved method of performing isometric exercises, as defined by claim 1, wherein said selected muscles are in the upper portion of the user's body, said method additionally comprising the step of:

tensing at least one muscle in the lower portion of the user's body, the force of said lower body muscles opposing the force of said upper body muscles during movement from said first position to said second position.

9. An improved method of performing isometric exercises, as defined by claim 1, wherein said handles are also laterally adjustable, said method additionally comprising the steps of adjusting the lateral spacing between said handles.

10. An improved method of performing isometric exercises, said method comprising:

(a) adjusting the spacing between a pair of substantially vertical bars to one of plural positions within the reach of a user, said bars lying in a common, substantially vertical plane;

(b) locking said bars in said position so that they are temporarily immovable;

(c) standing between the bars, with the user's torso spaced from said vertical plane, and without said plane;

(d) applying force against said immovable bars with the user's hands respectively, to isometrically exercise selected ones of the user's muscles in a first position;

(e) laterally moving the user's body in a smooth, fluid motion to laterally change the position of the user's body relative to said bars throughout a continuous range of positions, from said first position to a second position, the user's body upright and the user's weight at least partially on at least one of his feet during said change in position;

(f) maintaining force against said immovable bars during said lateral change in position to exercise said muscles throughout said continuous range of positions.

11. An improved method of performing isometric exercises, as defined by claim 10, additionally comprising the step of:

laterally moving the user's torso from said second position to said first position while maintaining force on said immovable bars.

12. An improved method of performing isometric exercises, as defined by claim 10, wherein said force applied to said bars is maintained in a first direction as the user moves between said first position and said second position.

13. An improved method of performing isometric exercises, ad defined by claim 12, additionally comprising the step of:

repeating steps (d) through (f), but with said force against said bars in a second direction.

14. An improved method of performing isometric exercises, as defined by claim 10, additionally comprising the step of:

changing the spacing between the user's torso and said vertical plane; and repeating steps (d) through (f).

15. An improved method of performing isometric exercises, as defined by claim 10, additionally comprising the step of:

repeating steps (a) through (f) for another of said plural positions of said bars.

16. An improved method of performing isometric exercises, as defined by claim 10, wherein said force is applied against said movable bars in a downward direction.

17. An exercise device for performing isometric exercises, comprising:

(a) first and second exercise handles, said handles independent of each other;

(b) first and second substantially vertical, horizontally spaced bars, for movably, adjustably mounting said first and second handles, respectively, such that said handles are independently adjustable on said bars to any one of plural, vertically directed positions within the reach of a user, said handles mounted to project outwardly, away from said bars, respectively;

(c) upper and lower frames for mounting at least one of said vertical bars so that it is movable relative to said frames for adjusting the horizontal spacing between said bars, and thereby adjust the horizontal spacing between said handles to any one of plural, horizontally-spaced, positions within the reach of a user;

(d) a locking mechanism, for independently, rigidly locking said at least one of said bars relative to said frames in one of said plural, horizontally-spaced positions, so that said bars are temporarily immovable in the horizontal direction; and (e) a locking mechanism for independently, rigidly locking said handles in one of said plural vertically directed positions on said bars, so that said handles are also temporarily immovable in the vertical direction.

18. An exercise device for performing isometric exercises, as defined by claim 17, wherein said handles are ring-shaped to permit the user to grasp said handles from various directions.

19. An exercise device for performing isometric exercises, as defined by claim 18, wherein said ring shaped handles are circular.

20. An exercise device for performing isometric exercises, as defined by claim 17, wherein said exercise handles are rotationally adjustable about said bars.

21. An exercise device for performing isometric exercises as defined by claim 17, wherein said exercise handles are rotationally adjustable about an axis perpendicular to said bars.

22. An exercise device for performing isometric exercises, as defined by claim 20, wherein said locking mechanism for rigidly locking said handles comprises:
- a set of leafed plates, mounted on one of said housings, said leafed plates having respective apertures therethrough for receiving one of said upright bars to mount said sets of plates on said bar;
- said apertures sized to permit said plate set to slide along said bar, and rotate thereabout, when said plates are generally perpendicular to said bar, but to grip said bar when inclined at an angle relative to said bar;
- means for biasing said leafed plates from a position generally normal to said bar to a position inclined relative to said bar, said plates sliding relative to each other during said biasing, said biasing causing the edges of each said apertures to press against said bar so that said plates grippingly lock said housing relative to said bar.

23. An exercise device for performing isometric exercises, comprising:
(a) a pair of handles, said handles ring-shaped to permit the user to grasp said hanles from various directions;
(b) means for mounting said handles;
(c) a pair of spaced, parallel, upright bars, mounting said handle mounting means, for adjusting the horizontal spacing between said handles to any one of plural, horizontally-spaced, positions within the reach of a user;
(d) means for locking said bars in one of said plural, horizontally-spaced positions, so that said handles are immovable in the horizontal direction, said locking means for said bars comprising (1) a frame for retaining said bars, said frame having a slot therein for receiving the end of said bars, said slot permitting horizontal movement of said bars along said frame and (2) a rotatably mounted cam connected to each of said bars, with said frame therebetween, said cam having a camming surface for selectively drawing said bars against said frame to temporarily lock said bars in one of said plural positions; and (e) means, on said handle mounting means, (1) for adjusting the vertical position of said handles to any one of plural, vertically directed positions within reach of said user, and (2) for locking said handles in one of said plural vertically directed positions, so that said handles are also temporarily immovable in the vertical direction.

24. An exercise device for performing isometric exercises, comprising:
- a horizontal upper frame;
- a horizontal lower frame;
- a pair of vertical bars having upper and lower ends, the upper end slideably mounted in said upper frame, and the lower end slideably mounted in said lower frame so that the horizontal spacing between said bars may be adjusted;
- means for selectively locking said pair of bars in a given position on said frames;
- a pair of housings, slideably and rotatably mounted on said pair of vertical bars, respectively;
- a pair of rings, mounted on said pair of housings, respectively, said rings rotationally adjustable about a horizontal axis to any of plural positions;
- means for selectively locking said pair of housings in one of plural positions on said pair of vertical bars, respectively; and
- means for selectively locking said pair of rings relative to said housings in one of plural positions.

25. An excercise device for performing isometric exercises, comprising:
- a horizontal upper frame;
- a horizontal lower frame;
- a pair of vertical bars having upper and lower ends, the upper end slidably mounted in said upper frame, and the lower end slidably mounted in said lower frame, the horizontal spacing between said bars adjustable by sliding said upper and lower ends in said upper and lower frames, respectively, the lower ends of said bars each having a plate attached thereto for bearing against the bottom of said lower frame to prevent said bars from being lifted out of said lower frame;
- a pair of rotatably mounted cams, connected to the upper ends of each of said bars, said cams each having a camming surface, bearing against said upper frame, for selectively drawing said bars upward to cause said plates to bear against the bottom of said lower frame to temporarily lock said bars in one of plural positions;
- a pair of ring-shaped handles;
- a pair of handle mounting assemblies, slidably and rotatably mounted on said bars, respectively, for mounting said ring-shaped handles on said bars, each of said handle mounting assemblies comprising:
  - a housing, comprising:
    - a socket, for receiving a corresponding lug on said ring-shaped handles, to mount said ring-shaped handles for rotatable adjustment about a horizontal axis, perpendicular to said bars; and means for locking said lug relative to said socket to temproarily lock said handles in one of plural positions;

upper and lower sets of leafed plates, mounted on one of said housings, the individual plates comprising said leafed plate sets having respective apertures therethrough for receiving one of said upright bars to mount said sets of plates on said bar;

said apertures sized to permit said plate sets to slide along said bar, and rotate thereabout, when said plates are generally perpendicular to said bar, but to grip said bar when inclined at an angle relative to said bar; and an over-center mechanism for biasing said leafed plate sets from a position generally normal to said bar to a position inclined relative to said bar, said individual plates sliding relative to each other during said biasing, said biasing causing the edges of each of said apertures to press against said bar so that said plates grippingly lock said housings relative to said bar, said over-center mechanism comprising:

a lever;

a link, pivotally mounted, at one end, intermediate the ends of said lever, and at the other end pivotally mounted to said lower set of leafed plates;

said lever providing a handle at one end, and pivotally mounted at the other end, to bear against said upper set of leafed plates; and said over-center mechanism, upon movement of said lever to a position parallel to said bar, biasing said plate sets to said position inclined relative to said bar.

26. An exercise device for performing isometric exercises comprising:

first and second upright bars, a frame for mounting at least one of said bars for movement relative to the other of said bars so that the horizontal spacing between said bars may be selectively adjusted to any of plural spacings;

first and second exercise handles, mounted to project outwardly from said first and second bars, respectively, each of said handles independently, rotationally adjustable to project from its respective bar in any of plural directions, and independently adjustable up and down its respective bar to any one of plural heights; and a locking device for locking said handles relative to said bars in any of said plural directions and at any of said plural heights on said bars to immobilize said handles during said isometric exercises.

27. An exercises device for performing isometric exercises, as defined by claim 26, wherein each of said handles is independently, rotationally adjustable about an axis perpendicular to its respective bar.

* * * * *